United States Patent
Baucom et al.

(10) Patent No.: US 6,244,630 B1
(45) Date of Patent: Jun. 12, 2001

(54) METHOD AND APPARATUS FOR NON-INTRUSIVE ON-LINE LEAK SEALING OF FLANGED PIPING CONNECTIONS

(75) Inventors: Johnny D. Baucom, Charlotte, NC (US); Michael D. Sullivan, Los Gatos, CA (US); Michael K. Phillips, Matthews, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 09/347,993

(22) Filed: Jul. 6, 1999

(51) Int. Cl.[7] .............................. F16L 55/00; F16L 23/00
(52) U.S. Cl. ......................... 285/15; 285/294.1; 285/412
(58) Field of Search .................................. 285/15, 294.1, 285/412; 138/97, 99

(56) References Cited

U.S. PATENT DOCUMENTS

| | | | | |
|---|---|---|---|---|
| 866,395 | * | 9/1907 | Skinner et al. | 285/15 X |
| 3,603,616 | * | 9/1971 | Smith | 285/15 |
| 3,770,301 | * | 11/1973 | Adams | 285/15 |
| 4,049,296 | * | 9/1977 | Harrison | 285/15 |
| 4,927,181 | * | 5/1990 | Ciotola | 285/15 |

* cited by examiner

Primary Examiner—Neill Wilson
(74) Attorney, Agent, or Firm—Pennie & Edmonds LLP

(57) ABSTRACT

A pressurized leaking flange joint is sealed with a ¼ circle load support structure, a jacking bolt extending therethrough and applying a radial load to a sealing plug between the flange gap. The sealing plug is a graphite packing ring placed into the flange gap on either side of a gasket centering ring, and a carbon steel compression ring (two ⅛ circles placed end-to-end) placed on top of the packing ring on either side of the gasket centering ring. The load support structure is installed such that the jacking bolt is centered over the flange gap. The jacking bolt is torqued and subsequently applies a radial load to the compression ring, which radial load is transferred to the load support structure and then to two flange bolts against which the load support structure bares. The radial load on the compression rings compresses the packing material into the pathway of the leak, thereby sealing the same. The jacking bolt is locked into place to maintain the radial load until a more permanent repair can be made during the subsequent maintenance or other shut down.

26 Claims, 5 Drawing Sheets

METHOD AND APPARATUS FOR NON-INTRUSIVE ON-LINE LEAK SEALING OF FLANGED PIPING CONNECTIONS

BRIEF DESCRIPTION OF THE INVENTION

This invention relates generally to maintaining seals between pipe sections. More particularly, this invention relates to a technique and apparatus for non-intrusive on-line leak sealing of flange pipe joints.

BACKGROUND OF THE INVENTION

Leakage of process piping flanged joints during plant operation is a major problem and challenges maintenance and operations personnel charged with keeping plant equipment operating at peak efficiency. In many cases, leaking flanges pose safety and environmental concerns leading to plant shutdown. Numerous factors can contribute to a leaking flanged joint. These factors include: insufficient bolt loading, poor flange alignment, improper gasket selection or an improper surface finish or dimensional preparation of the gasket-sealing surface on the flange. Many new practices have been developed and employed over the years to improve the reliability of the flange joint including new gasket materials, improved bolting practices and spring type washers.

However, regardless of the training and engineering practices implemented to ensure reliable performance of flange joints, failures still occur. When bringing the system down is not financially feasible, methods for sealing the leak while the pipe remains pressurized have been effectively utilized to stop most leaks. These methods hydraulically inject viscous sealing compounds into a secondary pressure vessel while the flange joint remains under system pressure and temperature.

These hydraulic injection methods have several implementation and design engineering drawbacks. The secondary pressure vessel must undergo detailed engineering design review to ensure the structural stability. Moreover, each leak presents different problems, e.g., the size of the leak, pressure criteria and pipe sizes; thus, secondary pressure vessels are not portable from one flange to the next. Highly trained and experienced specialty contract personnel are required to evaluate the problem, to design a solution and to fabricate and install the necessary hardware. In cases where the flange gap is very small or inconsistent, these methods frequently impart physical damage to the flanges, including mechanical peening to close gaps, and drilling and tapping of holes into the flanges for injection ports. Utilization of these methods frequently lead to major refurbishment or replacement of the flanges during the subsequent shutdown, which can be difficult, time consuming and expensive. Lastly, there is the potential for the injection of sealing compounds into the process system, which can cause entire system shutdowns.

Accordingly, there is a need in the art for a non-invasive method and apparatus for sealing a leaking pressurized flange joint.

SUMMARY OF THE INVENTION

The present invention provides a method and apparatus for sealing leaks in a pressurized flanged pipe joint. The apparatus, generally speaking, uses an elongated member (preferably a two piece jacking bolt) acting against a load support structure to apply and maintain a radial load to a sealing plug located between the two flanges. The loaded sealing plug seals the leak until a more permanent repair can be made when the system is shut down. The elongated member transfers the radial load to the load support structure, which in turn transfers the radial load to another solid object. In one embodiment the load support structure is an open channel bracket having a top wall with a hole for receiving the elongated member and two sidewalls configured to fit over the outside of the pressurized flanged joint such that the elongated member is positioned over the flange gap. In this embodiment, the two side walls each have at least two holes substantially aligned across from each other with each hole configured to fit over a flange bolt, such that the radial load is transferred from the load support structure to the flange bolts.

The method according to an embodiment of the present invention places an uncompressed sealing plug between the two flange faces, applies a load to the sealing plug with an elongated member (preferably a two piece jacking bolt) to substantially seal the leak. The load is maintained by a load support structure.

The present invention provides a method and apparatus for sealing a pressurized flanged joint that is non-invasive to the process system, does not physically alter or damage the flange, uses simple re-useable parts and can be applied by a typical plant mechanic.

BRIEF DESCRIPTION OF THE DRAWINGS

For a better understanding of the invention, reference should be made to the following detailed description taken in conjunction with the accompanying drawings, in which.

DETAILED DESCRIPTION OF THE PREFERRED EMBODIMENTS

Figure 1:
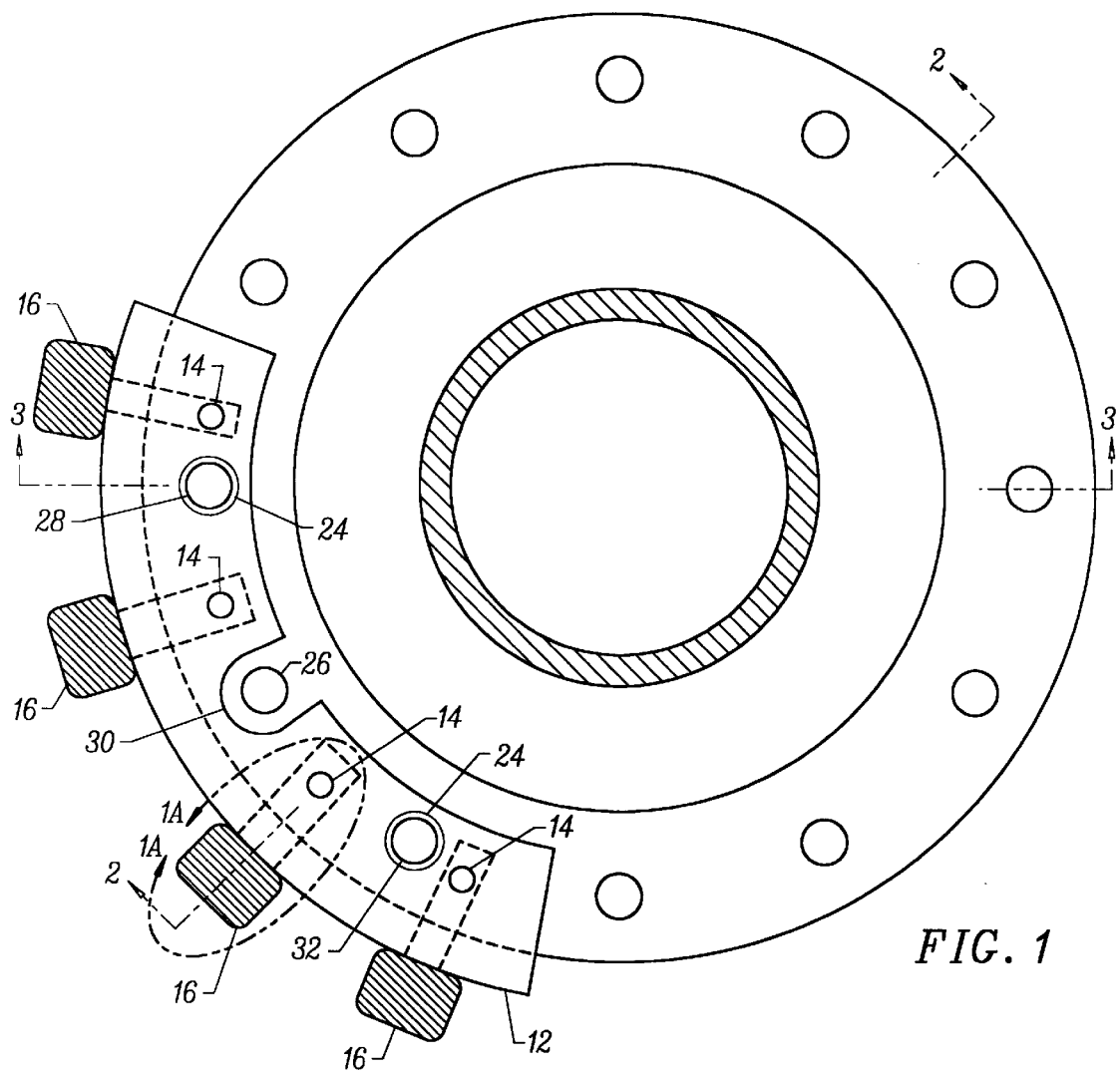
FIG. 1 is an axial view of a pressurized flange pipe with a sealing apparatus in accordance with an embodiment of the present invention.

Referring to FIG. 1, a non-invasive flange leak sealing device has arcuate load support structure 12, centering screws 14 and jacking bolts 16.

Figure 2:
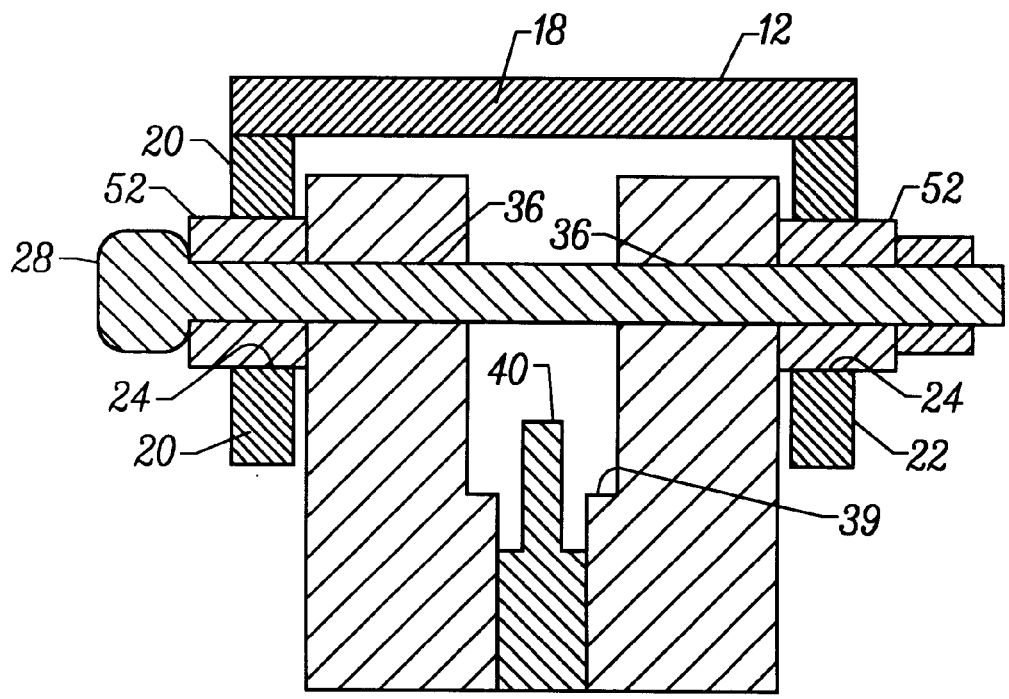
FIG. 2 is a sectional view through the sealing apparatus and flange joint taken along the line 2—2 of FIG. 1.
Figure 2:
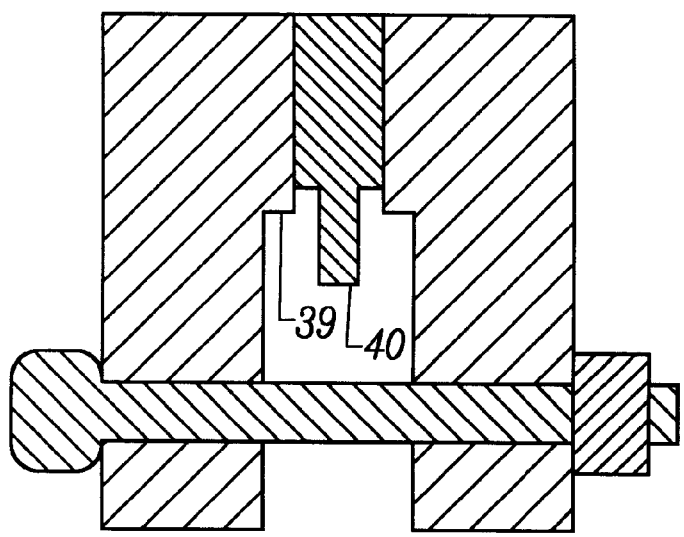

Referring to FIGS. 1 and 2, load support structure 12 has top wall 18, first side wall 20 and second side wall 22. First and second sidewalls 20 and 22 each have at least two apertures 24 and at least one slot 26 therebetween. Apertures 24 and slot 26 of first sidewall 20 substantially align with apertures 24 and slot 26 of second sidewall 22. This configuration permits installation of load support structure 12 over the flange joint, such that flange bolts 28, 30, and 32 extend through the apertures and the slot.

Figure 3:
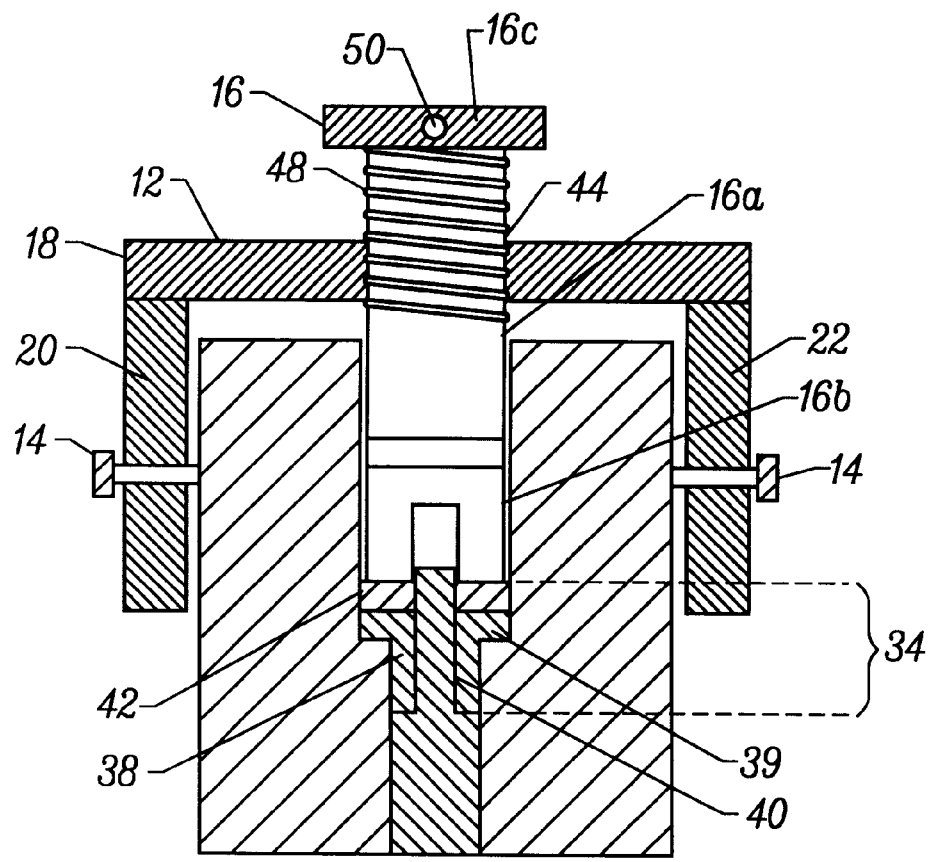
FIG. 3 is a sectional view through the sealing apparatus and flange joint taken along the line 3—3 of FIG. 1.
Figure 3:
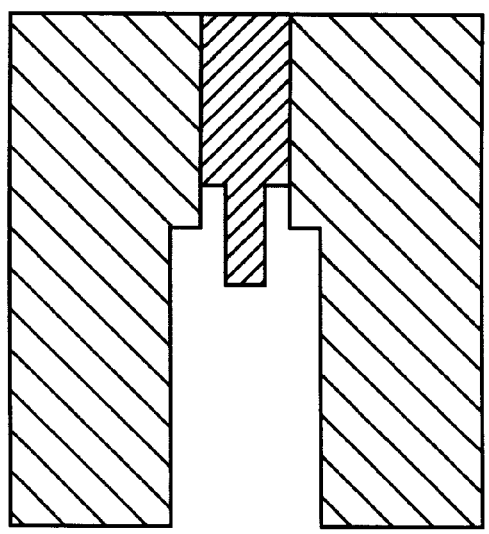

Referring to FIG. 1, load support structure 12 is installed by removing the outer flange bolts 28 and 32. Referring now to FIG. 3, sealing plug 34 is placed between the flange gap, which is more thoroughly discussed below and load support structure 12 is slid over the flanges such that apertures 24 align with the empty bolt holes (36, FIG. 2) and slot 26 slides over center flange bolt 30. Centering screws 14 are adjusted to center jacking bolt 16 over the gap and flange bolts 28 and 32 are replaced and tightened down.

Referring now to FIG. 3, sealing plug 34 preferably has two layers. First, packing rings 38 are placed inside the bolt circle of the flange, against the outer diameter of raised faces and sealing surfaces 39 and on either side of gasket centering ring 40. Metal compression rings 42 are placed against packing rings 38, which together make up sealing plug 34. Metal compression rings 42 may have holes (not shown) for inserting a long handle, which aids in properly placing compression rings 40 into the flange gap.

Preferably packing rings 38 are made from graphite, although any material suitable for the application may be used, e.g., compatible with the material or pressure flowing through the pipe. Without limitation some examples of suitable packing ring material are graphite rope, ceramics, Kevlar™, Gore-Tex™, fiberglass, Teflon™ and softer metals such as aluminum. Compression rings 42 are made from any material with sufficient strength to withstand the required load and to provide uniform compression of the packing material against the raised face split of the flanges, the gap between the two flanges or directly into an eroded or cut leak path of the flange face. Preferably compression rings 42 are made from carbon steel, although by way of example mild steel, tool steel, stainless steel or titanium would also be suitable. Compression rings 42 are preferably arcuate sections that span the approximate length of load support structure 12. After sealing plug 34 is in place, load support structure 12 is installed and jacking bolt 16 is used to apply a radial load to sealing plug 34.

Figure 1A:
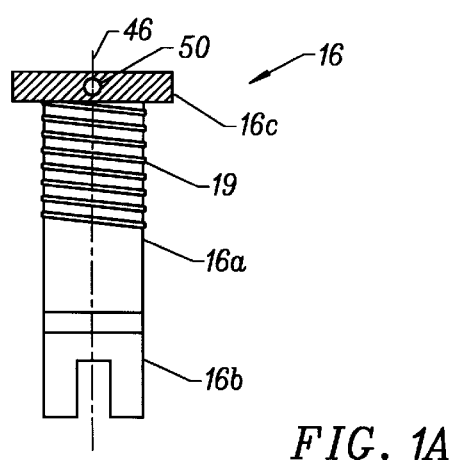
FIG. 1A is a side view of a jacking bolt of FIG. 1.

Referring to FIGS. 2 and 3, jacking bolt 16 extends through hole 44 provided in top wall 18 and preferably has three parts (FIGS. 1A and 3): main shaft 16a, working shaft 16b and nut 16c. Main shaft 16a is joined to working shaft 16b with a pivot pin (not shown). The pivot pin permits the two shafts 16a and 16b to rotate relative to each other about axis 46 (FIG. 1A), which allows main shaft 16a to be torqued without torquing working shaft 16b. The upper end of main shaft 16a and hole 44 have complementary threads 48 and nut 16c is pinned to the top of main shaft 16a with pin 50 to facilitate the application of torque to main shaft 16a. The lower end of working shaft 16b is split to fit around gasket centering ring 40 and to abut against sealing plug 34. The lower end of working shaft 16b may have shapes other than a split shape to suit the specific configuration of the flanged joint.

Jacking bolt 16 applies a radial load to sealing plug 34 as threads 48 of main shaft 16a abut against the corresponding threads of top wall 18, which forces the lower end of working shaft 16b to bare against sealing plug 34. Metal compression rings 42, under the applied load, compress the packing rings 38 into the leak path, thereby substantially sealing the leak. Jacking bolt 16 is locked into place to maintain the load and the entire assembly is left in place until the system is shut down for maintenance, at which time a more permanent repair can be made. The radial load is transferred to flange bolts 28 and 32 from load support structure 12.

Referring to FIG. 2, hardened bushings 52 are used to reduce stress on the flange bolts by displacing the load over a larger area, and to act as a hinge allowing load support structure 12 to swivel after one flange bolt has been tightened down. In an alternative embodiment, only one of the outer flange bolts is removed at any one time when installing load support structure 12. Thus, after the first outside flange bolt has been tightened the second outside flange bolt is removed, load support structure is swivelled into place and the second outside flange bolt is replace and tightened down.

Means other than threads may be used to abut jacking bolt 16 against load support member 12 and to apply a radial load to sealing plug 26 without deviating from the scope of the present invention. FIG. 1 shows four jacking bolts 16, more or fewer jacking bolts 16 may be used depending on the application and more than one load support structure 12 may be used to span up to the entire circumference of the flanged pipe joint. Also, it is preferable to provide view holes (not shown) in the top wall so that the engineer can see what is happening as the radial load is applied.

EXAMPLES

For testing purposes, the flanges were welded to standard schedule end caps, which were welded to another pipe at a comfortable working height. In each of the examples described below, leak tests were performed on a class 600 weld neck, 8" carbon steel raised face flange and used the following procedure for installing a class 600 metallic gasket: First, the seating surface of the gasket (FIGS. 4–7) was centered on the flange using visual inspection. The mating half of the flange was put into place and the gasket was inspected to ensure it remained centered on the flange. The flange bolts were then tightened using a series of three passes having torque values of 150 ft-lb, 300 ft-lb and 500 ft-lb and with a fourth pass to ensure that all the bolts were tightened to 500 ft-lb. The device was pressurized.

Each of the examples described below, unless additional procedures are specified, used the following procedures for sealing leaks: Three adjacent threaded studs in the area of the leak were selected. The two outside flange bolts were removed, leaving the center flange bolt in place to prevent the pressure from blowing out the gasket. Two strips of ¼" graphite packing were inserted into the gaps on either side of the gasket centering ring in the area of the leak and within the radius of the flange bolts. Care was taken to ensure the packing material properly conformed to the boss radius of the flange. Four ¼"×¼" circular sections carbon steel compression rings (two on either side of the centering ring) were then inserted into the gaps on either side of the centering ring within the radius of the flange bolts, such that they conformed to the packing material and aligned with the fixture. A ninety degree load support structure was placed over the flange and centered, hardened bushings were placed within the two outside holes and the two outside flange bolts were replaced and tightened down against the hardened bushings (FIGS. 1–3). Four two piece jacking bolts were inserted through the top wall of the load support structure, aligned and tightened in a clockwise manner to a torque value of approximately 50 ft-lb. If necessary additional ninety degree load support structures were installed in the same manner.

Example 1

Figure 4:
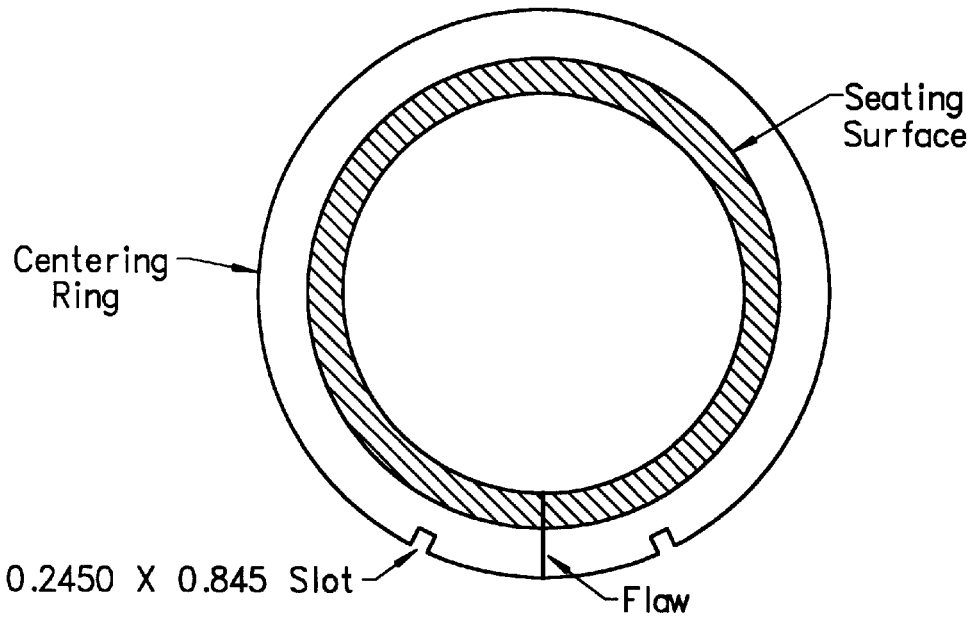
FIG. 4 is a plan view of an intentionally damaged gasket for Example 1.

One flaw, as shown in FIG. 4, was made in a class 600 metallic gasket, which was installed as described above. The flange was pressurized and began leaking at 400 psi (water pressure). Visual inspection showed that the centering ring in the area of the leak was deflected downward, preventing the installation of the graphite packing and carbon steel compression rings. Attempts were made to manually correct the deflection of the centering ring; however, the centering ring was too ridged. A drill bushing was developed and used to notch the carbon steel centering ring, which relieved the stress and allowed it to flex. The procedures described above were used to seal the leak.

Visual inspection showed that the leak was successfully stopped. The pressure was constant at approximately 600 to 605 psi.

Example 2

Figure 5:
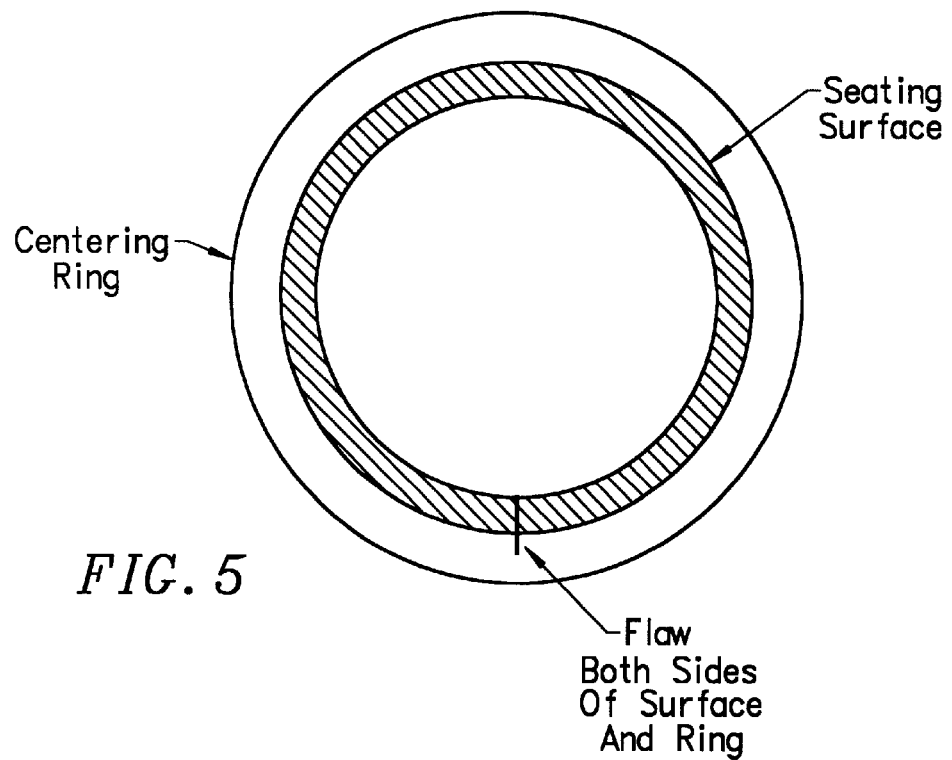
FIG. 5 is a plan view of an intentionally damaged gasket for Example 2.

One flaw, as shown in FIG. 5, was made in a class 600 metallic gasket, which was installed as described above. The severity of the flaw caused substantial deformation in the seating surface of the gasket.

The flange was pressurized and began leaking at approximately 85 psi (water pressure). The procedures described above were used to seal the leak, except ¼"×⁷⁄₁₆" compression rings were used. These larger compression rings were used because it was believed that the greater strength and rigidity would allow for a more even compression of the packing without deformation of the compression ring.

Visual inspection showed that the leak was significantly slowed; however, it was not completely stopped. The damage to the gasket proved too great for complete cessation of the leak.

Example 3

Figure 6:
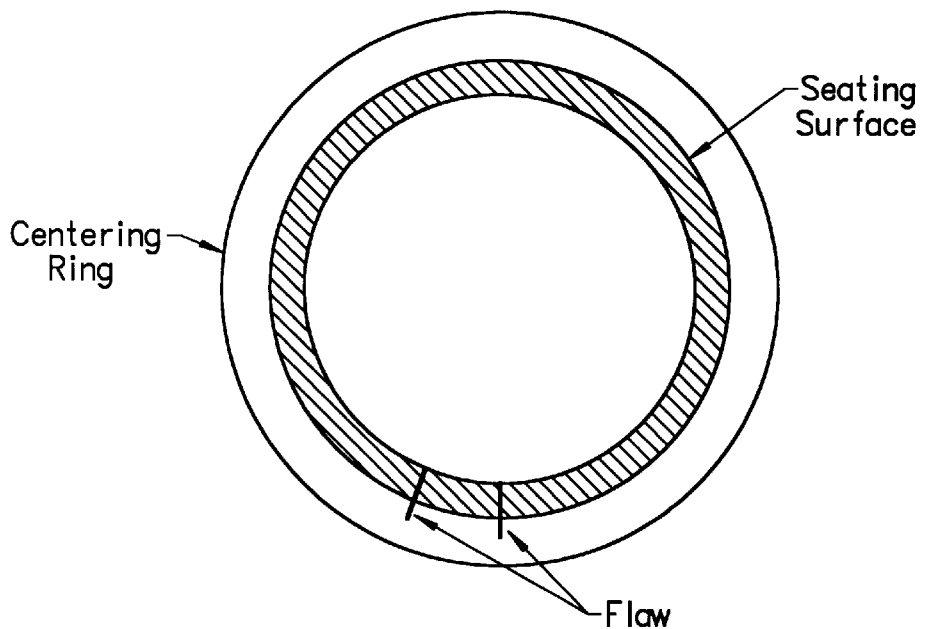
FIG. 6 is a plan view of an intentionally damaged gasket for Example 3.

Two flaws, as shown in FIG. 6, were made in a class 600 metallic gasket, which was installed as described above. Initially, these flaws were only inserted into the seating surface of the gasket, but this did not produce a leak and the flaws were extended into the centering ring.

The flange was pressurized and began leaking at approximately 85 psi (water pressure). The procedures described above were used to seal the leak, except ⁵⁄₁₆" graphite packing material was used to determine if there was any advantage over the ¼" material used in previous examples. The increased thickness made it more difficult to insert the compression rings without damaging the graphite packing material. Thus, there was no advantage to using the thicker graphite packing material.

Visual inspection showed that the leak was successfully stopped. The pressure was constant at approximately 619 to 623 psi.

Example 4

Figure 7:
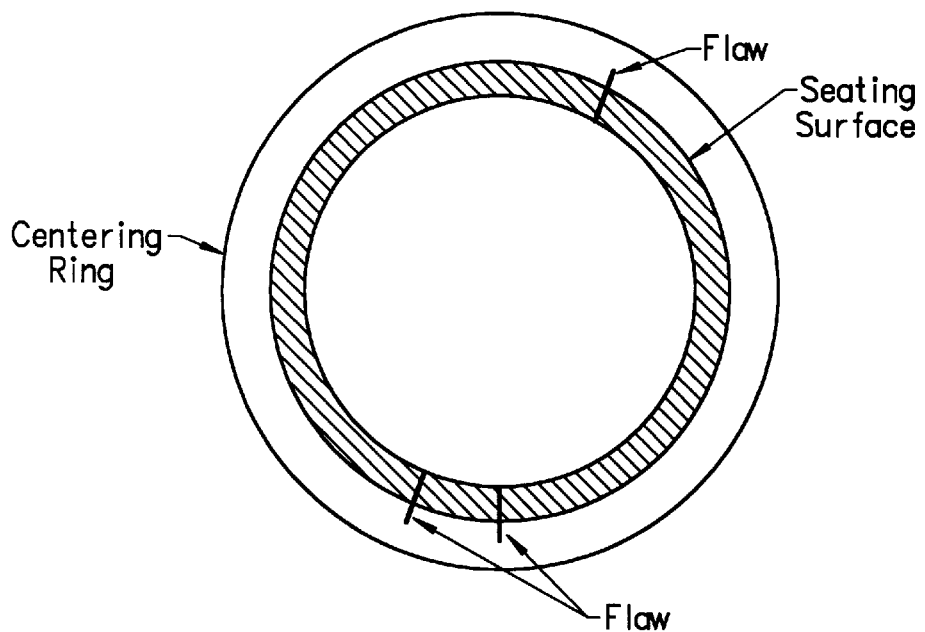
FIG. 7 is a plan view of an intentionally damaged gasket for Example 4.

Three flaws, as shown in FIG. 7, were made in a class 600 metallic gasket, which was installed as described above.

The flange was pressurized and began leaking at approximately 450 psi (water pressure). Leaking occurred at each of the flaws and the upper flaw produced significant water spray. The procedures described above were used to seal the leak, except two ninety degree support structures were installed because of the orientations of the leaks.

Visual inspection showed that the leaks were successfully stopped. The pressure was constant at approximately 640 to 655 psi.

Unlike the injection type leak sealing techniques, which require encapsulation around the fill circumference of the flange, the present invention can be applied to a localized arc of the flange circumference covering as little as two bolts side by side in the bolt circle.

The foregoing description, for purposes of explanation, used specific nomenclature to provide a thorough understanding of the invention. Nevertheless, the foregoing descriptions of the preferred embodiments of the present invention are presented for purposes of illustration and description and are not intended to be exhaustive or to limit the invention to the precise forms disclosed; obvious modifications and variations are possible in view of the above teachings. Several modes or combinations thereof, other than flange bolts extending into and baring against apertures or bushings, may be used for transferring the desired radial load to a secured object from load support structure without deviating from the scope of the present invention. For example and without limitation: welding the side walls to either side or both sides of the flange joint would provide the desired support by transferring the load to the flange; other such obvious modifications will be apparent to the skilled artisan. Although load support structure is shown as spanning 90 degrees of the flange circumference, load support structure 12 may span in excess of 180 or multiple flange support structures 12 may be used together to span as much of the entire circumference as is necessary for the particular application. If the gasket does not have a centering ring, such as in a tongue and groove type flange, sealing plug 16 may be placed in the gap between the two flange faces and a flat nosed working shaft 16*b* may be used to apply the required load to sealing plug 16. Additionally, packing rings 44 and compression rings 48 may be bonded together to form a single piece for installation. Accordingly, it is intended that the scope of the invention be defined by the following claims and their equivalents.

What is claimed is:

1. An apparatus for sealing leaks in a pressurized flanged pipe joint, the apparatus comprising:
    a load support structure configured to bare against at least one flange bolt; and
    an elongated member configured to apply a radial load to a sealing plug between the two flanges of the pressurized flanged pipe joint, wherein said elongated member transfers the radial load to said load support structure, whereby the radial load is transferred from said load support structure to at least one flange bolt.

2. The apparatus according to claim 1, wherein said load support structure bares against at least one of the two flanges, whereby the radial load is transferred from said load support structure to at least one of the two flanges.

3. The apparatus according to claim 1, wherein said load support structure is an open channel bracket having a top wall and two sidewalls depending from said top wall, said top wall having a hole therethrough for receiving said elongated member, and said two side walls being configured to fit over the outside of the pressurized flanged joint such that said hole is positioned over the flange gap of the pressurized flanged joint.

4. The apparatus according to claim 3, wherein said two sidewalls have a plurality of centering screws therethrough, which centering screws abut against the outside of the flange and are used to position said hole over the flange gap.

5. The apparatus according to claim 3, wherein said top wall has a plurality of holes therethrough for receiving a plurality of said elongated members, and wherein said plurality of holes are positioned over the flange gap of the pressurized flanged joint.

6. The apparatus according to claim 3, wherein said sidewalls each have at least one substantially aligned aperture extending therethrough, and wherein each said at least one substantially aligned aperture is configured to fit over a flange bolt, whereby the radial load is transferred to said flange bolt.

7. The apparatus according to claim 6, wherein said open channel bracket is configured to span at least three flange bolts.

8. The apparatus according to claim 7, wherein said sidewalls each have three substantially aligned apertures extending therethrough configured to fit over three flange bolts.

9. The apparatus according to claim 8, wherein two of said apertures are holes and the third is a slot.

10. The apparatus according to claim 8, wherein the three flange bolts are adjacent to each other.

11. The apparatus according to claim 9, wherein said elongated member is a two piece jacking bolt.

12. The apparatus according to claim 11, wherein two hardened bushings pass through the two holes.

13. An apparatus for sealing leaks in a pressurized flanged pipe joint, the apparatus comprising:

a sealing plug located between the two flanges of the pressurized flanged pipe joint;

an elongated member configured to apply a radial load to said sealing plug; and an open channel load support structure having a top wall and two sidewalls depending from said top wall, said top wall having a hole therethrough for receiving said elongated member, and said two side walls being configured to fit over the outside of the pressurized flanged joint such that said hole is positioned over the flange gap of the pressurized flanged joint, wherein said elongated member transfers the radial load to said open channel load support structure wherein said sidewalls each have at least one substantially aligned aperture extending therethrough, and wherein each said at least one substantially aligned aperture is configured to fit over a flange bolt, whereby the radial load is transferred to the flange bolt.

14. The apparatus according to claim 13, wherein said sealing plug has a first layer and a second layer on top of said first layer.

15. The apparatus according to claim 14, wherein said first layer is selected from the group consisting of graphite rope, ceramics, poly-paraphenylene terephthalamide, fiberglass, polytetrafluroethylene, aluminum and combinations thereof, and wherein said second layer is selected from the group consisting of carbon steel, mild steel, tool steel, stainless steel, titanium and combinations thereof.

16. A method for sealing a leak in a pressurized flanged pipe joint comprising the steps of:

placing an uncompressed sealing plug between the two flange faces of said flanged pipe joint;

applying a load to said uncompressed sealing plug with an elongated member thereby substantially sealing said leak;

maintaining said load with said load support structure;

installing said load support structure over said flanged pipe joint, wherein said load support structure is an open channel bracket having a top wall and two sidewalls depending from said top wall:

removing at least one flange bolt from at least one flange bolt hole in said flanged pipe joint:

aligning at least one aperture extending through said two side walls over said at least one flange bolt hole, and replacing and tightening down said at least one flange bolt.

17. The method according to claim 16, wherein prior to the replacing and tightening step the load support structure is centered over the flange gap, wherein a hole through said top wall of said load support structure is positioned over the flange gap of the pressurized flanged joint, said hole being configured to receive said elongated member.

18. The method according to claim 17, wherein said placing step further comprises:

inserting a first layer between the two flange faces of said flanged pipe joint; and inserting a second layer on top of said first layer to form said uncompressed sealing plug.

19. An apparatus for sealing leaks in a pressurized flanged pipe joint, the apparatus comprising:

a load support structure extending along a fraction of the total circumference of a pressurized flanged pipe joint; and an elongated member configured to apply a radial load to a sealing plug between the two flanges of the pressurized flanged pipe joint.

20. The apparatus according to claim 19, wherein said load support structure bares against at least one flange bolt, whereby the radial load is transferred from said load support structure to at least one flange bolt.

21. The apparatus according to claim 19, wherein said load support structure is an open channel bracket having a top wall and two sidewalls depending from said top wall, said top wall having a hole therethrough for receiving said elongated member, and said two side walls being configured to fit over the outside of the pressurized flanged joint such that said hole is positioned over the flange gap of the pressurized flanged joint.

22. The apparatus according to claim 21, wherein said two sidewalls have a plurality of centering screws therethrough, which centering screws abut against the outside of the flange and are used to position said hole over the flange gap.

23. The apparatus according to claim 21, wherein said top wall has a plurality of holes therethrough for receiving a plurality of said elongated members, and wherein said plurality of holes are positioned over the flange gap of the pressurized flanged joint.

24. The apparatus according to claim 21, wherein said sidewalls each have at least one substantially aligned aperture extending therethrough, and wherein each said at least one substantially aligned aperture is configured to fit over a flange bolt, whereby the radial load is transferred to said flange bolt.

25. The apparatus according to claim 24, wherein said open channel bracket is configured to span at least three flange bolts.

26. The apparatus according to claim 25, wherein said sidewalls each have three substantially aligned apertures extending therethrough configured to fit over three flange bolts.

* * * * *